(12) United States Patent
Li

(10) Patent No.: US 10,379,646 B2
(45) Date of Patent: Aug. 13, 2019

(54) DISPLAY DEVICE

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventor: Xiong Li, Shenzhen (CN)

(73) Assignee: FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 142 days.

(21) Appl. No.: 15/588,800

(22) Filed: May 8, 2017

(65) Prior Publication Data

US 2018/0150149 A1    May 31, 2018

(30) Foreign Application Priority Data

Nov. 25, 2016   (CN) .......................... 2016 1 1051327

(51) Int. Cl.
*G06F 3/041*    (2006.01)
*G02F 1/1333*   (2006.01)

(52) U.S. Cl.
CPC ........ *G06F 3/041* (2013.01); *G02F 1/133308* (2013.01); *G02F 1/13338* (2013.01); *G02F 2001/133314* (2013.01); *G02F 2001/133322* (2013.01); *G02F 2001/133325* (2013.01); *G02F 2201/503* (2013.01)

(58) Field of Classification Search
CPC ..... G06F 3/041–0418; G02F 1/133308; G02F 1/13338; G02F 2201/503; G02F 2001/133314; G02F 2001/133322; G02F 2001/13325
See application file for complete search history.

(56) References Cited

U.S. PATENT DOCUMENTS

| | | | |
|---|---|---|---|
| 6,118,434 A * | 9/2000 | Nishitani | B60K 35/00 340/438 |
| 2003/0048598 A1* | 3/2003 | Lee | G06F 1/1626 361/679.55 |
| 2004/0160422 A1* | 8/2004 | Choi | G06F 1/1601 345/173 |
| 2004/0165265 A1* | 8/2004 | Harris | H04N 13/31 359/464 |
| 2005/0128693 A1* | 6/2005 | Itoh | G06F 1/1626 361/679.26 |
| 2008/0094787 A1* | 4/2008 | Kabeya | G06F 1/1613 361/679.01 |

(Continued)

*Primary Examiner* — David Tung
(74) *Attorney, Agent, or Firm* — ScienBiziP, P.C.

(57) ABSTRACT

A high strength display device comprises a touch panel, a liquid crystal display, and a frame. The liquid crystal display covers the touch panel to expose peripheral edges of the touch panel. The peripheral edges of the touch panel are mounted to the frame, so that the liquid crystal display is mounted between the touch panel and the frame. A plurality of screw studs are formed on a surface of the liquid crystal display facing away from the touch panel. A plurality of first screw holes is defined in the frame, the plurality of first screw holes corresponds to the plurality of screw studs. The frame is mounted to the liquid crystal display through the plurality of screw studs and the plurality of first screw holes to add higher structural strength and durability.

9 Claims, 3 Drawing Sheets

(56) References Cited

U.S. PATENT DOCUMENTS

| | | | | |
|---|---|---|---|---|
| 2008/0144297 A1* | 6/2008 | Asano | ................... | H05K 7/142 |
| | | | | 361/759 |
| 2015/0103287 A1* | 4/2015 | Saitou | ................... | B60R 11/02 |
| | | | | 349/58 |
| 2015/0198189 A1* | 7/2015 | Hsu | ................... | F16B 5/02 |
| | | | | 411/366.1 |

* cited by examiner

DISPLAY DEVICE

FIELD

The subject matter relates to a display device.

BACKGROUND

Display devices for vehicles usually comprise touch panels, liquid crystal display (LCD) modules, and supporting frames stacked together and engaged to form a sandwich structure. When the display device gets bigger and heavier, the touch panel may easily be disengaged from the display device.

BRIEF DESCRIPTION OF THE DRAWINGS

Implementations of the present technology will now be described, by way of example only, with reference to the attached figures, wherein.

DETAILED DESCRIPTION

Figure 1:
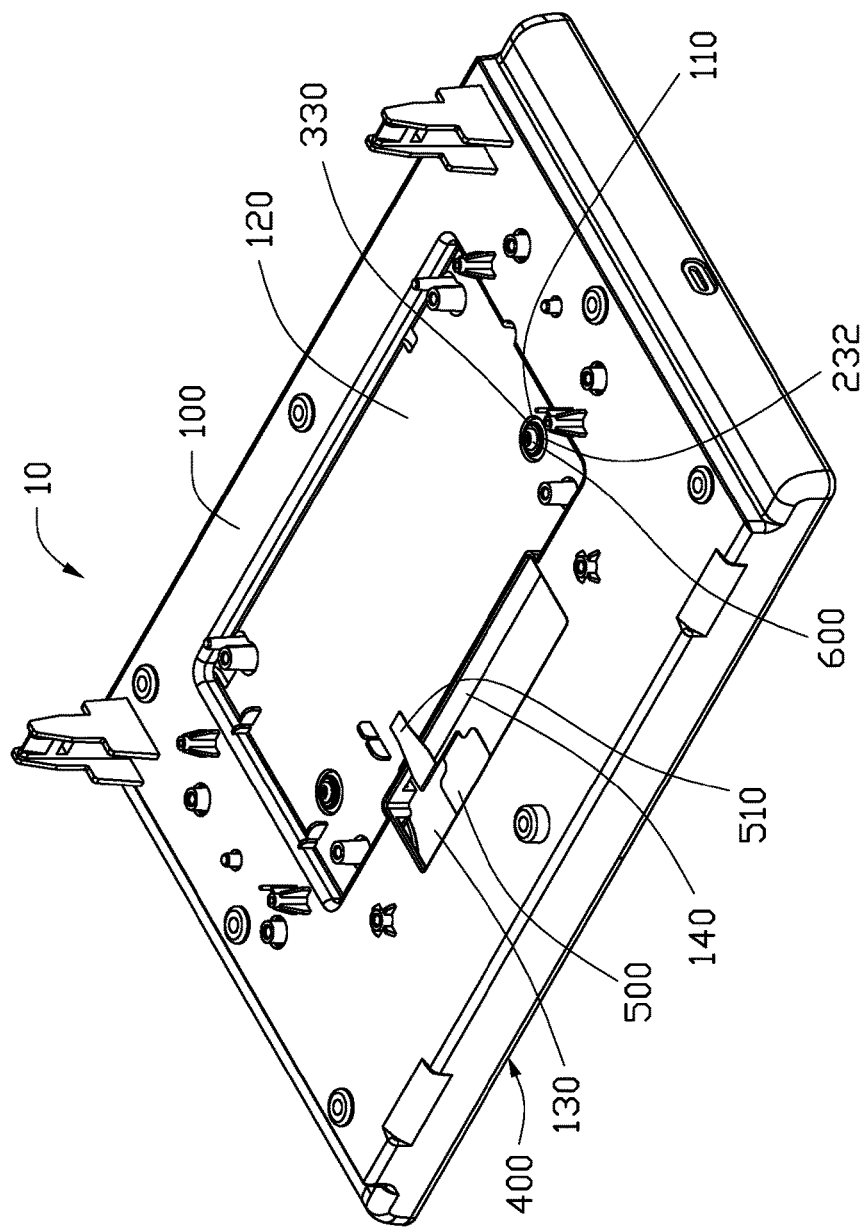
FIG. 1 is an isometric view of an exemplary embodiment of a display device.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

One definition that applies throughout this disclosure will now be presented.

The term "comprising," when utilized, means "including, but not necessarily limited to"; it specifically indicates open-ended inclusion or membership in the so-described combination, assembly, series and the like.

Figure 2:
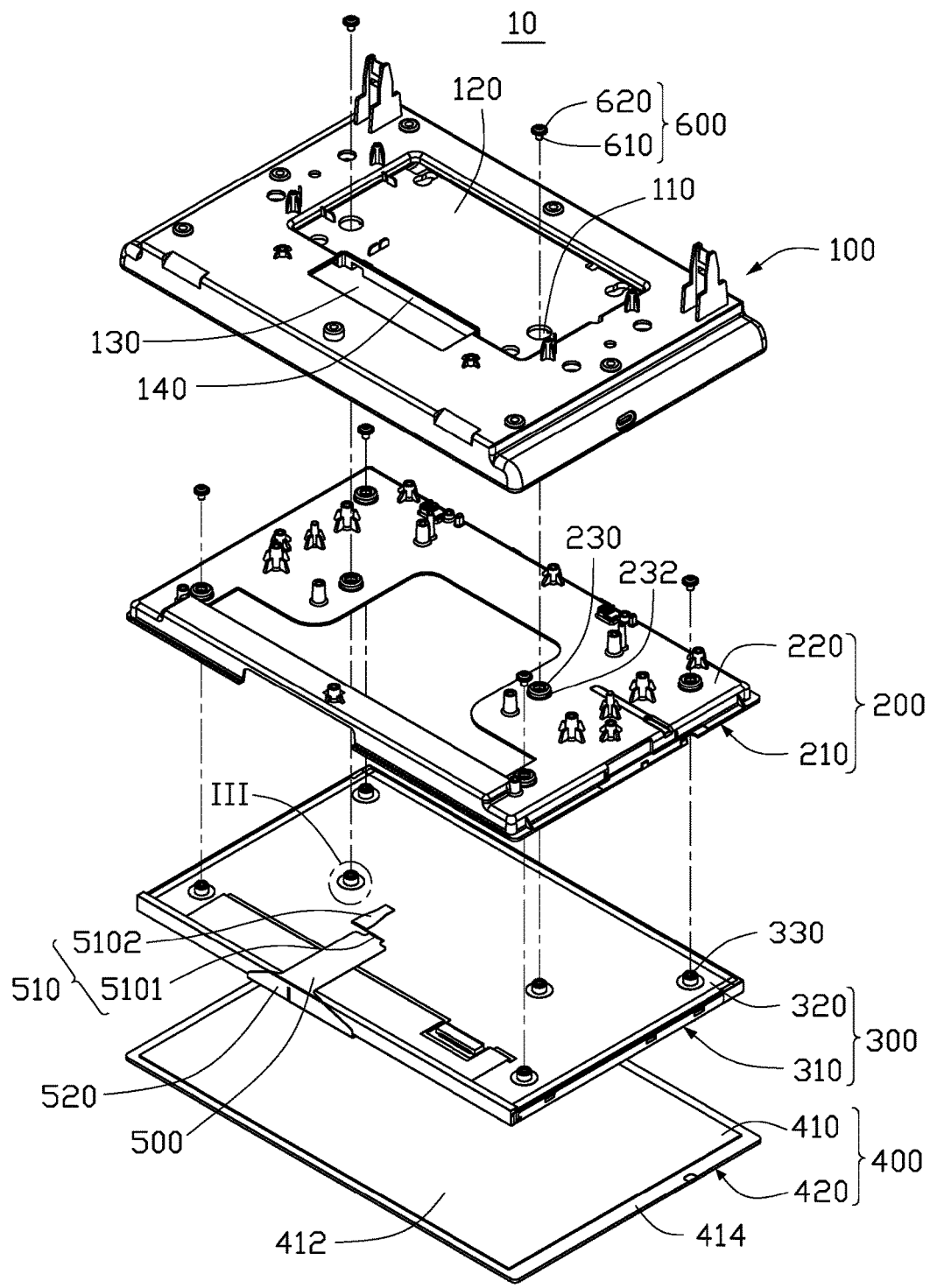
FIG. 2 is an exploded view of the display device of FIG. 1.
Figure 3:
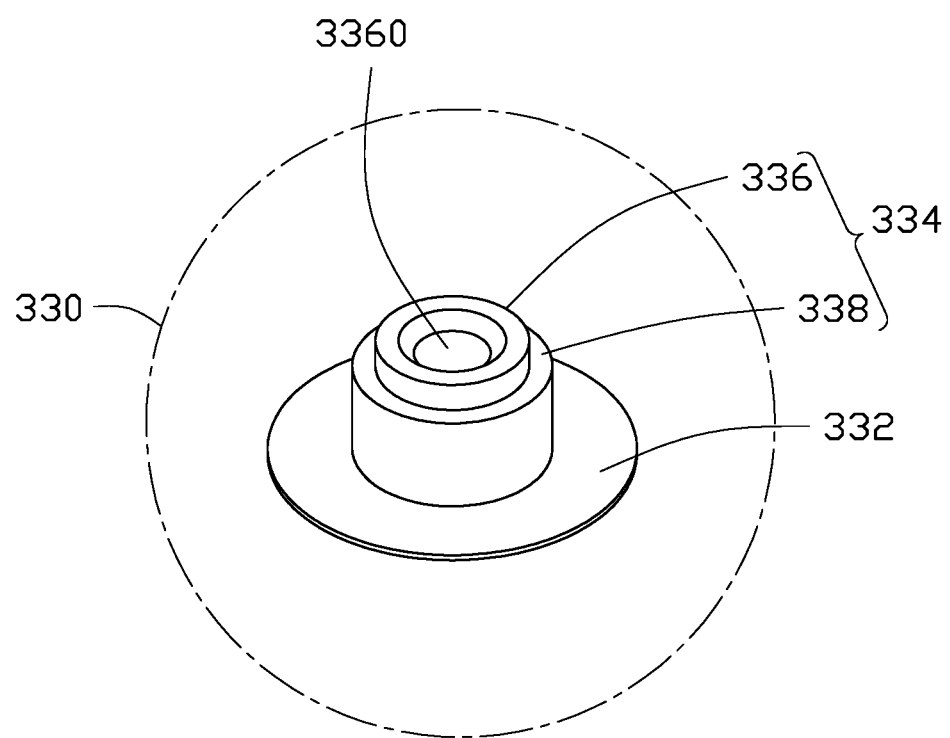
FIG. 3 is isometric view of circled portion II of FIG. 2.

FIGS. 1 to 3 illustrate a display device 10. In FIG. 2, the display device 10 comprises a cover 100, a frame 200, a liquid crystal display (LCD) 300, a touch panel 400, and a bracket 500. The touch panel 400, the liquid crystal display (LCD) 300, the bracket 500, the frame 200, and the cover 100 are attached together in that order.

In the exemplary embodiment, the cover 100 is a cuboid, and is made of metal (such as iron) or metal alloy. A plurality of through holes 110 are defined in the cover 100. The through holes 110 pass through the cover 100. In the exemplary embodiment, the number of the through holes 110 is two. The two through holes 110 are formed on opposite edges of cover 100. A groove 120 is defined at a center of a surface of the cover 100. The groove 120 is cuboid in shape. The two through holes 110 are located at a bottom surface of the groove 120 and near opposite sidewalls of the groove 120. The cover 100 further defines an opening 130 adjacent to the groove 120 and passing through the cover 100. The opening 130 and the groove 120 form an interconnecting sidewall 140 therebetween.

The frame 200 comprises an upper surface 210 and a lower surface 220. The upper surface 210 and the lower surface 220 are opposite surfaces of the frame 200. The lower surface 220 faces the cover 100. The upper surface 210 faces away from the cover 100. A plurality of first screw holes 230 are defined in frame 200, and pass through the upper surface 210 and the lower surface 220. Two of the first screw holes 230 correspond to the two through holes 110, respectively. In the exemplary embodiment, a cylindrical flange 232 protrudes from the lower surface 220 and is formed around each first screw hole 230. The outer diameter of the cylindrical bulge 232 is less than or equal to the diameter of the two through holes 110. The frame 200 and the cover 100 are aligned and assembled by two cylindrical bulges 232 and two through holes 110.

The LCD 300 comprises a front surface 310 and a rear surface 320. The front surface 310 and the rear surface 320 are opposite surfaces of the LCD 300. The front surface 310 is parallel to the rear surface 320. The rear surface 320 faces the upper surface 210. The front surface 310 faces away from the upper surface 210.

A plurality of screw studs 330 is on the rear surface 320. The screw studs 330 and the LCD 300 are integrally formed. The screw studs 330 correspond to the first screw holes 230. Two of the screw studs 330 correspond to two of the first screw holes 230 and to two of the through holes 110. Referring to FIG. 3, the screw stud 330 comprises a base 332 and a cylindrical portion 334. The base 332 is mounted on the rear surface 320. The cylindrical portion 334 is at the center area of the base 332. In the exemplary embodiment, the cylindrical portion 334 is a hollow cylinder. The cylindrical portion 334 comprises a first member 336 on the base 332 and a second member 338. A lower portion of the first member 336 is surrounded by the second member 338. Both the first member 336 and the second member 338 form the cylindrical portion 334. A second screw hole 3360 is defined in the first member 336. The height of the second member 338 is less than the height of the first member 336. The outer diameter of the second member 338 is smaller than the diameter of the first screw hole 230. The cylindrical portion 334 can extend to the first screw hole 230. In the exemplary embodiment, the base 332 is on the rear surface 320. The base 332 is parallel to the rear surface 320.

In the exemplary embodiment as shown in FIG. 2, the touch panel 400 is a cuboid. The size of the touch panel 400 is substantially the same as the size of the frame 200. The touch panel 400 comprises a first surface 410 and a second surface 420. The first surface 410 and the second surface 420 are opposite surfaces of the touch panel 400. The first surface 410 is parallel to the second surface 420. The first surface 410 faces the front surface 310. The second surface 420 faces away from the front surface 310. The first surface 410 comprises a display area 412 and a non-display area 414. The display area 412 is surrounded by the non-display area 414. A size of the display area 412 is equal to a size of the LCD 300. The display area 412 is electrically connected to the LCD 300. The non-display area 414 is connected to the edge of the upper surface 210.

The bracket 500 comprises a clamping portion 520 and a protruding portion 510 extending from the clamping portion 520. The clamping portion 520 wraps around the rear surface 320 and one side of the LCD 300. The protruding portion 510 comprises a connecting portion 5101 and a free end 5102. The connecting portion 5101 is perpendicular to the rear surface 320. The free end 5102 perpendicularly extends from the connecting portion 5101 and is parallel to the rear surface 320. The connecting portion 5101 passes through the opening 130, so that the free end 5102 is exposed from the cover 100 and resists the interconnecting sidewall 140. The protruding portion 510 is used to further clamp the cover 100 and the frame 200 together.

The display device 10 further comprises a plurality of screw bolts 600. The screw bolts 600 are engaged with the second screw holes 3360 to assemble the display device 10. Each screw bolts 600 comprises a screw arbor 610 and a nut 620. The nut 620 is at one end of the screw arbor 610. Two of the screw arbors 610 pass through two of the through holes 110 and two corresponding first screw holes 230, and are received in two corresponding second screw holes 3360. The nuts 620 resist the top surface of the first members 336 of the cylindrical portions 334. The height of the second member 338 being different from the first member 336 renders it convenient to disassemble the screws bolt 600 from the second screw hole 3360.

In assembly, a double-sided adhesive tape (not shown) is first adhered to the non-display area 414. Then, the LCD 300 is aligned with the displayed area 412 and placed on the display area 412. The peripheral edges of the frame 200 are bonded to the non-display area 414 by the double-sided adhesive tape. The frame 200 is further fastened to the LCD 300 through the screw bolts 600 and the screw stud 330, thereby mounting the LCD 300 between the frame 300 and the touch panel 400. The cover 100 covers the frame 200, with the screw studs 330 being aligned with two through holes 110 and passing through the through holes 110. Then, the cover 100 is mounted to the frame 200 by the screw bolts 600, so that the frame 200 and the LCD 300 are between the cover 100 and the touch panel 400. The protruding portion 510 further clamps the cover 100 and the frame 200 together.

With the above configuration, the display device 10 includes the screw studs 330 on the rear surface 320, and the first screw holes 230 are defined in the frame 200. The screw studs 330 can be engaged with the first screw hole 230 to assemble the LCD 300 and the frame 200 together. Thus, connection strength, shock proofing and vibration proofing between the LCD 300 and the frame 200 are improved.

The exemplary embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including, the full extent established by the broad general meaning of the terms used in the claims.

What is claimed is:

1. A display device comprising:
   a touch panel;
   a liquid crystal display;
   a frame;
   wherein the liquid crystal display covers the touch panel and exposes peripheral edges of the touch panel, the peripheral edges of the touch panel are mounted to the frame such that the liquid crystal display is mounted between the touch panel and the frame, a plurality of screw studs are formed on a surface of the liquid crystal display facing away from the touch panel, a plurality of first screw holes is defined in the frame, the plurality of first screw holes corresponds to the plurality of screw studs, the frame is mounted to the liquid crystal display through the plurality of screw studs and the plurality of first screw holes;
   a plurality of second screw holes are defined in the plurality of screw studs, the display device comprises a plurality of screw bolts, and the plurality of screw bolts corresponds to the plurality of second screw holes;
   each of the plurality of screw studs comprises a base and a cylindrical portion, the cylindrical portion is on the base, the cylindrical portion is a hollow cylinder;
   wherein the cylindrical portion comprises a first member above the base and a second member, a lower portion of the first member is surrounded by the second member, a height of the second member is less than a height of the first member, each of the plurality of second screw holes is defined in the cylindrical portion; and
   a bracket, wherein the bracket comprises a clamping portion and a protruding portion extending from the clamping portion, the clamping portion pressed against the rear surface and one side of the liquid crystal display,
   wherein the protruding portion comprises a connecting portion and a free end, the free end perpendicularly extends from the connecting portion and is parallel to the rear surface of the liquid crystal display, the connecting portion passing through an opening of a cover so that the free end is exposed from the cover and resist an interconnecting sidewall of the cover, and
   wherein the protruding portion is used to further clamp the cover and the frame together.

2. The display device of claim 1, wherein the plurality of screw bolts is engaged with the plurality of second screw holes to mount the frame and the liquid crystal display together.

3. The display device of claim 1, wherein the plurality of screw studs and the liquid crystal display are integrally formed.

4. The display device of claim 1 wherein each of plurality of screw bolts comprises a screw arbor and a nut, the nut is at one end of the screw arbor, the screw arbor is received in one of the plurality of second screw holes.

5. The display device of claim 4, wherein the screw arbor passes through one of the plurality of first screw hole.

6. The display device of claim 1, wherein the non-display area is bonded to the frame.

7. The display device of claim 1 further comprising a cover, wherein the cover is mounted to the frame.

8. The display device of claim 7, wherein two through holes are defined in the cover, the plurality of screw studs passes through the two through holes to mount the cover and the frame.

9. The display device of claim 8, wherein two of the plurality of screw bolts are engaged with the two of the plurality of screw studs to mount the cover and the frame.

\* \* \* \* \*